United States Patent
Lalam

(10) Patent No.: US 10,285,151 B2
(45) Date of Patent: May 7, 2019

(54) USER EQUIPMENT PROPOSING A DURATION TO BE APPLIED TO A TIME DELAY TO BE SET BY EQUIPMENT OF A CORE NETWORK

(71) Applicant: SAGEMCOM BROADBAND SAS, Rueil-Malmaison (FR)

(72) Inventor: Massinissa Lalam, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 14/904,532

(22) PCT Filed: Jul. 11, 2014

(86) PCT No.: PCT/EP2014/064951
§ 371 (c)(1),
(2) Date: Jan. 12, 2016

(87) PCT Pub. No.: WO2015/007651
PCT Pub. Date: Jan. 22, 2015

(65) Prior Publication Data
US 2016/0198428 A1     Jul. 7, 2016

(30) Foreign Application Priority Data
Jul. 15, 2013   (FR) .................. 13 56951

(51) Int. Cl.
*H04W 60/02* (2009.01)
*H04W 76/04* (2009.01)
(Continued)

(52) U.S. Cl.
CPC .......... *H04W 60/02* (2013.01); *H04W 76/10* (2018.02); *H04W 76/20* (2018.02); *H04W 60/04* (2013.01)

(58) Field of Classification Search
CPC ...... H04W 60/02; H04W 76/04; H04W 76/02
See application file for complete search history.

(56) References Cited

U.S. PATENT DOCUMENTS 8,583,101 B1 *  11/2013  Xu ................... H04W 52/0216
                                                         455/422.1
9,544,926 B2 *   1/2017  Zakrzewski ............ H04W 4/70
(Continued)

FOREIGN PATENT DOCUMENTS

EP        2 464 180        6/2012

OTHER PUBLICATIONS

International Search Report for PCT/EP2014/064951 dated Aug. 6, 2014, two pages.
(Continued)

*Primary Examiner* — Khawar Iqbal
(74) *Attorney, Agent, or Firm* — Nixon & Vanderhye P.C.

(57) ABSTRACT

A cellular communication network comprises a core network interconnecting a set of cells, an item of equipment in the core network being responsible for managing the mobility of the user equipment between the cells. An item of user equipment transmits (401) to said equipment in the core network an attachment request message for registering itself and also transmitting a message requesting updating of localization areas at the expiry of a period with a duration set by said equipment in the core network in an attachment acceptance message and/or in a message accepting updating of localization areas. The user equipment includes, in each message requesting attachment to the core network and/or in each message requesting updating of localization areas, a proposed duration to be applied to said time delay.

7 Claims, 2 Drawing Sheets

(51) Int. Cl.
*H04W 76/10* (2018.01)
*H04W 76/20* (2018.01)
*H04W 60/04* (2009.01)

(56) References Cited

U.S. PATENT DOCUMENTS

| | | | | |
|---|---|---|---|---|
| 2010/0189036 A1* | 7/2010 | Liu | ............... | H04W 60/02 370/328 |
| 2012/0142371 A1* | 6/2012 | Park | ............... | H04W 60/02 455/456.1 |
| 2013/0265990 A1* | 10/2013 | Lee | ............... | H04W 60/00 370/336 |
| 2013/0315072 A1* | 11/2013 | Hietalahti | ............... | H04W 76/10 370/242 |
| 2014/0153408 A1* | 6/2014 | Jun | ............... | H04L 65/1066 370/250 |
| 2014/0221010 A1* | 8/2014 | Gotou | ............... | H04W 4/70 455/456.1 |
| 2015/0117213 A1* | 4/2015 | Pinheiro | ............... | H04W 28/0284 370/235 |
| 2015/0146518 A1* | 5/2015 | Tan | ............... | H04L 41/06 370/218 |
| 2015/0282241 A1* | 10/2015 | Bergius | ............... | H04W 76/18 370/329 |
| 2016/0014632 A1* | 1/2016 | Siow | ............... | H04L 5/0085 370/230 |
| 2016/0219482 A1* | 7/2016 | Smith | ............... | H04W 36/0072 |
| 2017/0019938 A1* | 1/2017 | Salkintzis | ............... | H04W 8/186 |
| 2017/0033978 A1* | 2/2017 | Tan | ............... | H04L 41/06 |

OTHER PUBLICATIONS

Written Opinion of the ISA for PCT/EP2014/064951 dated Aug. 6, 2014, five pages.

* cited by examiner

USER EQUIPMENT PROPOSING A DURATION TO BE APPLIED TO A TIME DELAY TO BE SET BY EQUIPMENT OF A CORE NETWORK

This application is the U.S. national phase of International Application No. PCT/EP2014/064951 filed 11 Jul. 2014 which designated the U.S. and claims priority to FR Patent Application No. 1356951 filed 15 Jul. 2013, the entire contents of each of which are hereby incorporated by reference.

The present invention relates to management of user equipment in a cellular communication network and more particularly to a periodic time delay used by said user equipment to send a request to update localization areas.

In a cellular communication network, each user equipment UE must specify its position (at the cell level) to equipment of the cellular communication network responsible for managing the mobility of the user equipment within the cellular communication network. This equipment of the cellular communication network transmits the position of the user equipment UE to a database responsible for storing the positions of each item of user equipment UE, so as to enable said user equipment UE to be contacted by interrogation of said database. When the user equipment is in communication ("connected UE"), this localization does not pose any particular problem since the user equipment accesses the cellular communication network through one or more base stations the geographical position of which is known in principle from the database. A problem is posed when the mobile is switched on but is inactive, that is to say the user equipment is not in communication ("idle UE"). In order to address this problem, geographical areas are typically defined by grouping together a plurality of cells served by a plurality of respective base stations. The GSM ("Global System for Mobile Communication") standard uses the concept of localization area, the UMTS ("Universal Mobile Telecommunication System") standard adds the concept of routing area, and the LTE ("Long-Term Evolution") standard uses the concept of tracking area, but these ideas correspond to the same concept. Each localization area has a particular identifier, which is transmitted by the base stations serving the cells belonging to said localization area, which enables each item of user equipment UE to know in which localization area said item of user equipment UE is situated and enables the database to know in which localization area said item of user equipment UE is situated.

Each item of user equipment UE triggers a procedure for attachment to the network (at startup for example) by indicating the localization area in which said item of user equipment UE is situated. In the event of a positive response to this attachment procedure, the user equipment UE then receives a list of localization areas that said user equipment UE must now monitor.

Each item of user equipment UE that has already succeeded in an attachment procedure has a list of localization areas that said user equipment UE must monitor. This list necessarily contains the localization area where said user equipment UE is situated and typically adjacent localization areas. Each item of user equipment UE triggers a procedure for updating localization areas when said user equipment UE detects that said user equipment UE is situated in a localization area not belonging to the list of localization areas that said user equipment UE must monitor. In the case of a positive response to this procedure of updating localization areas, the user equipment UE then receives a new list of localization areas that said user equipment UE must now monitor.

Each item of user equipment also triggers, periodically, a procedure of updating localization areas as long as said user equipment UE does not enter a localization area belonging to the list of localization areas that said user equipment UE must monitor, in order to signify in which localization area said user equipment UE is situated within the list of localization areas that said user equipment UE must monitor. In the event of a positive response to this procedure of periodic updating of localization areas, the user equipment UE can receive a new list of localization areas that said user equipment UE must now monitor or, in the absence of any specific indication, keep the same list of localization areas that said user equipment UE monitored up until then. The periodicity of triggering of this procedure is defined by means of a time delay, the duration of which is specified by the equipment of the cellular communication network responsible for managing the mobility of the user equipment in the cellular communication network. The duration of this time delay is typically set according to criteria for loading the cellular communication network. In the GSM standard, this time delay is defined by the T3213 timer; in the UMTS standard the time delay is given by the T3312 timer; and in the LTE standard this time delay is given by the T3412 timer. However, some items of user equipment do not have the same usage conditions as others. For example, a residential gateway or a smart meter does not have a mobile character, unlike a smartphone. Thus many exchanges of messages occur in the communication network, whereas items of user equipment concerned do not have a mobile character, or only a little.

It is desirable to overcome these drawbacks of the prior art.

It is in particular desirable to limit the exchanges of messages in the cellular communication network, and more particularly to limit the exchanges in the context of NAS ("Non-Access Stratum") procedures.

It is in particular desirable to provide a solution that is simple to implement.

The invention relates to a method for managing an item of user equipment in a cellular communication network comprising a core network interconnecting a set of cells, an item of equipment in the core network being responsible for managing the mobility of the user equipment between the cells, the user equipment transmitting to said equipment of the core network an attachment request message to register itself with the core network, the user equipment transmitting to said equipment of the core network a message requesting updating of localization areas at the expiry of a periodic time delay with a duration set by said equipment of the core network in an attachment acceptance message and/or in a message accepting updating of localization areas. The management method is such that said user equipment includes, in each message requesting attachment to the core network and/or in each message requesting updating of localization areas, a proposed duration to be applied to said delay. Thus, by enabling the user equipment to propose a duration of said time delay to said equipment of the core network, it is possible for the equipment of the core network to take into account the fact that the user equipment may have a mobile character, or may not or only a little. The actual duration of the time delay being ultimately set by said equipment of the core network, this enables the equipment of the core network to confirm or deny the proposed duration, a choice that may also take into account criteria of loading of the cellular communication network.

According to a particular embodiment, the user equipment being intended to be immobile, the user equipment defines said proposed duration as representing a deactivation of said time delay. Thus the exchanges are significantly reduced in the NAS procedures when the user equipment is intended to be immobile (elimination of the NAS procedure for periodic updating of localization areas, the frequency and occurrences of other NAS procedures being unchanged).

According to a particular embodiment, when said equipment of the core network receives a message requesting attachment to the core network or a request to update localization areas including information representing a deactivation of said time delay, said equipment of the core network activates another time delay of a predetermined duration and, when the user equipment has not established a connection via the cellular communication network before expiry of said other time delay, said equipment of the core network transmits at least one message seeking said user equipment. Thus said equipment of the core network may check on the presence of said user equipment in the cellular communication network, even if the periodic procedure for updating localization areas is suspended.

According to a particular embodiment, said equipment of the core network reinitialises said other time delay when said equipment of core network receives, coming from said user equipment, a message requesting updating of localization areas. Thus the reception of such a request enables the equipment of said core network to confirm that said user equipment is still present in the cellular communication network.

According to a particular embodiment, said equipment of the core network limits, in the message accepting attachment and/or in the message accepting updating of localization areas, a list of localization areas to be monitored by said user equipment at a single localization area. Thus, fewer messages seeking said user equipment are sent to check on the presence of said user equipment in the cellular communication network.

According to a particular embodiment, said equipment of the core network identifies said single localization area by extracting, from the message requesting attachment to the core network and/or from the message requesting updating of localization areas, information representing a localization area where said user equipment is located.

According to a particular embodiment, said user equipment is a residential gateway or a smart meter.

The invention also concerns user equipment intended to be used in a cellular communication network comprising a core network interconnecting a set of cells, an item of equipment in the core network being responsible for managing the mobility of the user equipment between the cells, the user equipment being suitable for transmitting to said equipment of the core network an attachment request message for registering with the core network, the user equipment also being suitable for transmitting to said equipment in the core network a message requesting updating of localization areas at the expiry of a periodic time delay of a duration set by said equipment of the core network in an attachment acceptance message and/or in a message accepting updating of localization areas. The user equipment is such that it comprises means for including, in each message requesting attachment to the core network and/or in each message requesting updating of localization areas, a proposed duration to be applied to said time delay.

According to a particular embodiment, said user equipment is a residential gateway or a smart meter.

The features of the invention mentioned above, as well as others, will emerge more clearly from a reading of the following description of an example embodiment, said description being given in relation to the accompanying drawings, among which:

The following description of an example embodiment is given with the terminology associated with LTE technologies, but a person skilled in the art can easily adapt it from other cell technologies, in particular, but not exclusively, GSM, GPRS or UMTS technologies.

Figure 1:
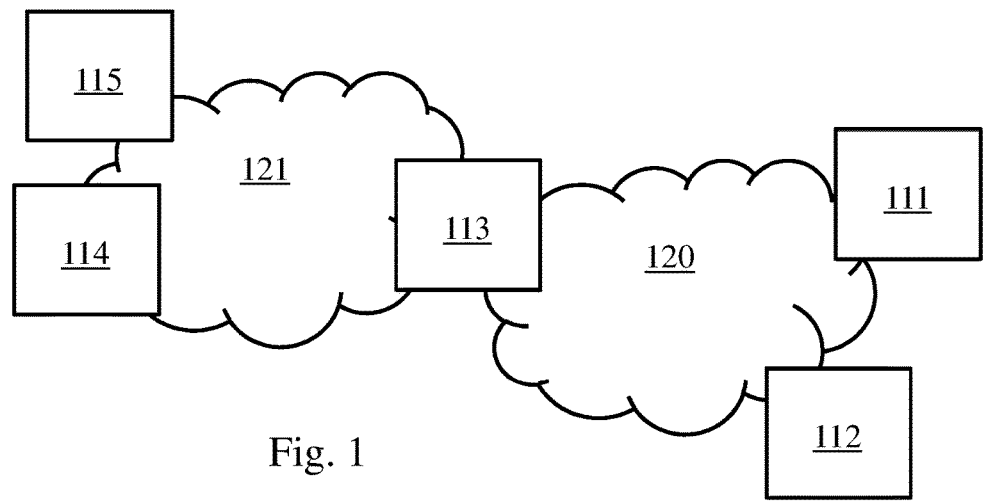
FIG. 1 illustrates schematically a cellular communication network in which the present invention can be implemented.

FIG. 1 illustrates schematically a cellular communication network, in which the invention can be implemented. The cellular communication network comprises a core network 121 and a set of cells. A single cell 120 is shown in FIG. 1 for reasons of simplification. Each cell is managed by a base station 113, also referred to as eNodeB in LTE technologies. The cells in the cellular communication network are geographically grouped together in localization areas, each being identified by a localization area code (LAC). Each cell enables user equipment 111, 112 to access the services of the cellular communication network.

The core network comprises an item of equipment 114 responsible for managing the mobility of the user equipment between the cells covering a given geographical area. This equipment is referred to as MME ("mobility management entity") in LTE technologies. For reasons of simplification, the equipment responsible for managing the mobility of the user equipment between the cells is hereinafter referred to as MME equipment. The core network further comprises an item of equipment 115 responsible for managing user profiles for subscription to the services of the cellular communication network. This equipment is referred to as HSS ("home subscriber server") in LTE technologies. For reasons of simplification, the equipment responsible for managing the user profiles is hereinafter referred to as HSS equipment.

To enable the user equipment 111 to register itself with the core network (or more generally with the cellular communication network), the user equipment 111 is suitable for transmitting an attachment request message to the MME equipment 114. A procedure is then established between the user equipment 111 and the MME equipment 114, as described below in relation to FIG. 4A.

To enable the MME equipment 114 to check the presence of the user equipment 111 in the coverage area of the cellular communication network, the user equipment 111 is suitable for transmitting to the MME equipment 114 a message requesting updating of localization areas either when said user equipment 111 changes area, or periodically if said user equipment 111 does not change area. A procedure is then established between the user equipment 111 and the MME equipment 114, as described below in relation to FIG. 4B. In the periodic case, the periodicity of this transmission of a message requesting updating of localization areas is defined by a time delay T1, the duration of which is set by the MME equipment 114. The MME equipment 114 supplies the time delay duration value T1 in the context of procedures for registration and updating of localization areas, a value to be applied to the T3412 timer in LTE technologies. As detailed below, the user equipment 111 does however propose a duration for the time delay T1, which makes it possible to take into account the mobile character, or the immobile or only slightly mobile character, of the user equipment 111.

Figure 2:
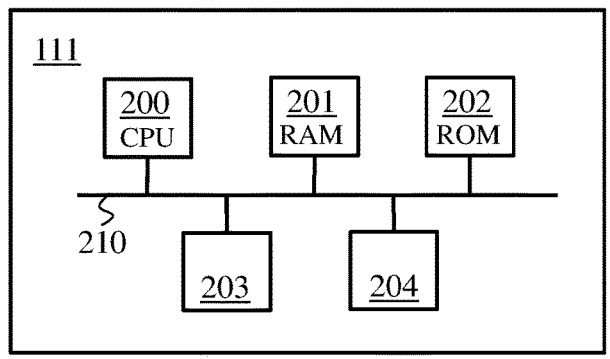
FIG. 2 illustrates schematically an example of hardware architecture of user equipment in the cellular communication network.

FIG. 2 illustrates schematically an example of hardware architecture of the user equipment 111. The user equipment 111 then comprises, connected by a communication bus 210: a processor or CPU (central processing unit) 200; a random access memory RAM 201; a read-only memory ROM 202; at least one storage unit 203, such as a hard disk HDD (hard disk drive) and/or a storage medium reader, such as an SD (secure digital) card reader; and an interface 204 for communicating with the cellular communication network.

The processor 200 is capable of executing instructions loaded into the RAM 201 from the ROM 202, from an external memory (not shown), from a storage medium, or from a communication network. When the user equipment 111 is powered up, the processor 200 is capable of reading instructions from the RAM 201 and executing them. These instructions form a computer program causing all or some of the algorithms and steps described in relation to the user equipment 111 to be implemented by the processor 200.

Thus all or some of the algorithms and steps described in relation to the user equipment 111 can be implemented in software form by execution of a set of instructions by a programmable machine, such as a DSP (digital signal processor) or a microcontroller. All or some of the algorithms and steps described in relation to the user equipment 111 can also be implemented in hardware form by a machine or a dedicated component, such as an FPGA (field-programmable gate array) or an ASIC (application-specific integrated circuit).

Figure 3:
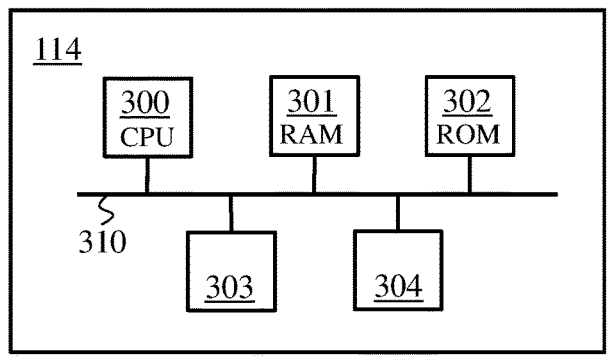
FIG. 3 illustrates schematically an example of hardware architecture of equipment responsible for managing the mobility of the user equipment in the cellular communication network.

FIG. 3 illustrates schematically an example of hardware architecture of the MME equipment 114. The MME equipment 114 then comprises, connected by a communication bus 310: a processor or CPU 300; a random access memory RAM 301; a read only memory ROM 302; at least one storage unit 303, such as a hard disk HDD and/or a storage medium reader, such as an SD card reader; and an interface 304 for communicating within the cellular communication network.

The processor 300 is capable of executing instructions loaded into the RAM 301 from the ROM 302, from an external memory (not shown), from a storage medium, or from a communication network. When the MME equipment 114 is powered up, the processor 300 is capable of receiving instructions from the RAM 301 and executing them. These instructions form a computer program causing all or some of the algorithms and steps described in relation to the MME equipment 114 to be implemented by the processor 300.

Thus all or some of the algorithms and steps described in relation to the MME equipment 114 can be implemented in software form by the execution of a set of instructions by a programmable machine, such as a DSP or a microcontroller.

All or some of the algorithm steps described in relation to the MME equipment 114 may also be implemented in hardware form by a machine or a dedicated component such as an FPGA or an ASIC.

Figure 4A:
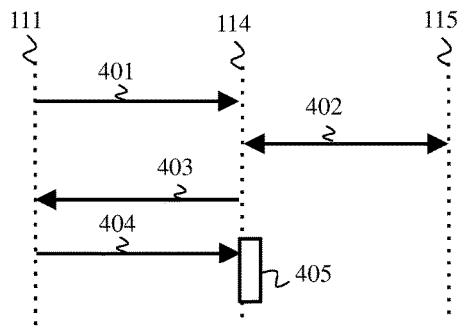
FIG. 4A illustrates schematically exchanges in the context of a procedure for registration of the user equipment with the cellular communication network.

FIG. 4A illustrates schematically exchanges in the context of a procedure of registering user equipment 111 with the cellular communication network.

In a step 401, the user equipment 111 transmits an attachment request message to the MME equipment 114 in order to register itself with the core network. In LTE technologies, this message is referred to as ATTACH REQUEST. The user equipment 111 includes in said message a proposed duration to be applied to the time delay T1.

When the user equipment 111 is intended to be immobile, which is for example the case when the user equipment 111 is a residential gateway providing access to the internet, the user equipment 111 defines said proposed duration as representative of a deactivation of the time delay T1.

In a following step 402, the MME equipment 114 exchanges with the HSS equipment the equipment 115 in order to prepare the environment necessary for the user equipment 111 to establish connections via the cellular communication network, in particular by checking the user profile for subscription to the services of the cellular communication network that is associated with the user equipment 111. In the context of LTE technologies, allocation of an IP (internet protocol) address to the user equipment 111 results from step 402.

Furthermore, the MME equipment 114 extracts, from the message sent at step 401 by the user equipment 111, the duration proposal made by the user equipment 111 for the time delay T1. The MME equipment 114 checks whether the proposed value is compatible with the current state of the cellular communication network, for example in particular with respect to a criterion of loading of the cellular communication network and/or of the core network. If the value proposed is compatible, the MME equipment 114 can confirm the value proposed by the user equipment 111; otherwise the MME equipment 114 determines the duration value to be applied to the time delay T1 without taking into account the value proposed by the user equipment 111.

In a following step 403, the MME equipment 114 transmits a response message to the user equipment 111. Unless a problem has occurred at step 402, this response message is an attachment acceptance message. In LTE technologies, this message is called ATTACH ACCEPT. The attachment acceptance message includes the duration value to be applied to the time delay T1, as decided by the MME equipment 114 according to the proposal made by the user equipment 111.

The message transmitted at step 403 may also include a list of localization areas that the user equipment 111 must monitor. In a particular embodiment, the MME equipment 114 limits, in the attachment acceptance message, the list of localization areas to be monitored to a single localization area. In an even more particular embodiment, the MME equipment 114 identifies said single localization area by extracting, from the message transmitted at step 401, information representing the localization area where the user equipment 111 is located.

In a following step 404, the user equipment 111 transmits to the MME equipment 114 a message confirming the completion of the registration procedure. In LTE technologies, this message is called ATTACH COMPLETE.

In a particular embodiment, when the MME equipment 114 receives at step 401 an attachment request message including information representing deactivation of the time delay T1, the core MME equipment 114 activates, in a step 405, after reception of the message transmitted at step 404, another time delay T2 of predetermined duration. The management of this other time delay T2 is described below in relation to FIGS. 5A and 5B.

Figure 4B:
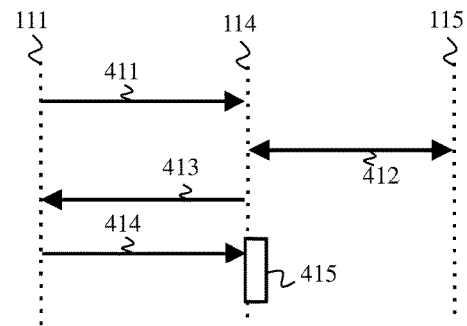
FIG. 4B illustrates schematically exchanges in the context of a procedure for updating localization areas.

FIG. 4B illustrates schematically exchanges in the context of a procedure for updating localization areas.

In a step 411, the user equipment 111 transmits to the MME equipment 114 a message requesting updating of localization areas. In LTE technologies, this message is called TRACKING AREA UPDATE REQUEST. The user equipment 111 includes in said message a proposed duration to be applied to the time delay T1.

When the user equipment 111 is intended to be immobile, which is for example the case when the user equipment 111 is a residential gateway, the user equipment 111 defines said proposed duration as representing a deactivation of the time delay T1.

In a following step 412, the MME equipment 114 exchanges with the HSS equipment 115 in order to make any updates of context associated with the user equipment 111, in particular with regard to the location of the user equipment 111 in the cellular communication network.

Furthermore, the MME equipment 114 extracts, from the message sent at step 411 by the user equipment 111, the duration proposal made by the user equipment 111 for the time delay T1. The MME equipment 114 checks whether the proposed value is compatible with the current state of the cellular communication network, in particular with respect to, for example, a criterion of loading of the cellular communication network and/or of the core network. If the proposed value is compatible, the MME equipment 114 can confirm the value proposed by the user equipment 111; otherwise the MME equipment 114 determines the duration value to be applied to the time delay T1 without taking into account the value proposed by the user equipment 111.

In a following step 413, the MME equipment 114 transmits a response message to the user equipment 111. Unless a problem has occurred at step 412, this response message is a message accepting updating of localization areas. In LTE technologies, this message is called TRACKING AREA UPDATE ACCEPT. The message accepting updating of localization areas includes the duration value to be applied to the time delay T1, as decided by the MME equipment 114 according to the proposal made by the user equipment 111.

The message transmitted at step 413 may further include a list of localization areas that the user equipment 111 must monitor. In a particular embodiment, the MME equipment 114 limits, in the message accepting updates of localization areas, the list of localization areas to be monitored to a single localization area. In an even more particular embodiment, the MME equipment 114 identifies said single localization area by extracting, from the message transmitted at step 411, information representing the localization area where the user equipment 111 is located.

In a following step 414, the user equipment 111 transmits to the MME equipment 114 a message confirming the completion of the procedure updating localization areas. In LTE technologies, this message is called TRACKING AREA UPDATE COMPLETE.

In a particular embodiment, when the other time delay is used and when the MME equipment 114 receives at step 411 a message requesting updating of localization areas including information representing deactivation of the time delay T1, the MME equipment 114 activates or reinitialises, in a step 415 after reception of the message transmitted at step 414, said other time delay T2.

Figure 5A:
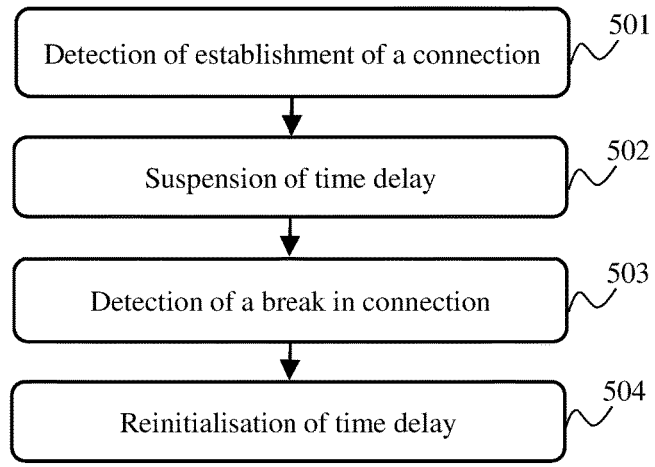
FIG. 5A illustrates schematically an algorithm for managing a time delay for verifying the presence of the user equipment in the cellular communication network.

FIG. 5A illustrates schematically an algorithm for managing a time delay for checking the presence of the user equipment 111 in the cellular communication network. In the context of FIG. 5A, it is considered that the MME equipment 114 has previously instructed the user equipment 111 to deactivate the time delay T1 and has activated the time delay T2.

In a step 501, the MME equipment 114 detects that the user equipment 111 establishes a connection via the cellular communication network.

In a following step 502, the MME equipment 114 suspends the time delay T2.

In a following step 503, the MME equipment 114 detects that the user equipment 114 breaks the connection established via the cellular communication network.

In a following step 504, the MME equipment 114 reinitialises, and therefore reactivates, the time delay T2.

Figure 5B:
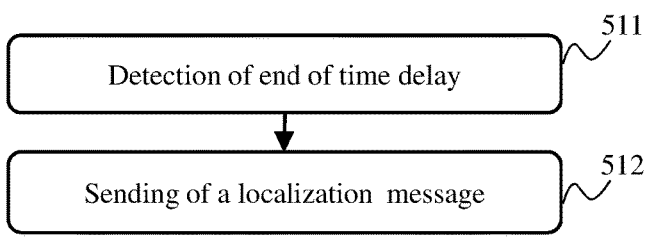
FIG. 5B illustrates schematically an algorithm for verifying the presence of the user equipment in the cellular communication network.

FIG. 5B illustrates schematically an algorithm for checking the presence of the user equipment 111 in the cellular communication network.

In a step 511, the MME equipment 114 detects that the other time delay T2 has expired. In other words, the user equipment 111 has not established a connection via the cellular communication network before expiry of the other time delay T2.

In a following step 512, the MME equipment 114 transmits at least one message seeking the user equipment 111 in the communication network. Paging request is then spoken of, for finding the location of the user equipment 111.

The invention claimed is:

1. Method for managing an item of equipment, called item of user equipment in a cellular communication network comprising a core network interconnecting a set of cells, an item of equipment in the core network, called item of core network equipment, being responsible for managing the mobility of the item of user equipment between the cells, the method comprising:

transmitting, from the item of user equipment and to said item of core network equipment, an attachment request message to register the item of user equipment with the core network;

transmitting, from the item of user equipment and to said item of core network equipment, a message requesting updating of localization areas at the expiry of a periodic time delay with a duration set by said item of core network equipment in an attachment acceptance message and/or in a message accepting updating of localization areas, wherein said item of user equipment includes, in each attachment request message requesting attachment to the core network and/or in each message requesting updating of localization areas, a proposed duration to be applied to said delay, wherein the item of user equipment includes, in the attachment request message requesting attachment to the core network or in the message requesting updating of localization areas, information representing deactivation of said periodic time delay causing an activation, in said item of core network equipment, of another time delay of a predetermined duration enabling said item of core network equipment to transmit at least one message seeking said item of user equipment, when the item of user equipment has not established a connection via the cellular communication network before the expiry of said other time delay, wherein said item of core network equipment reinitializes said other time delay when said item of core network equipment receives, from said item of user equipment, a message requesting updating of localization areas, and wherein said item of core network equipment limits, in the attachment acceptance message and/or in the message accepting updating of localization areas, a list of localization areas to be monitored by said item of user equipment to a single localization area.

2. Management method according to claim 1, wherein, the item of user equipment being intended to be immobile, the item of user equipment defines said proposed duration as representing a deactivation of said periodic time delay.

3. Management method according to claim 1, wherein said item of core network equipment identifies said single localization area by extracting, from the message requesting attachment to the core network and/or from the message requesting updating of localization areas, information representing a localization area where said item of user equipment is located.

4. Management method according to claim 1, wherein said item of user equipment is a residential gateway or a smart meter.

5. Non transitory information storage medium, storing a computer program comprising program code instructions which can be loaded in a processor to cause said processor to implement the method according to claim 1, when said program code instructions are executed by the processor.

6. Item of user equipment intended to be used in a cellular communication network comprising a core network interconnecting a set of cells, an item of equipment in the core network, called item of core network equipment, being responsible for managing the mobility of the item of user equipment between the cells, the item of user equipment being suitable for transmitting, from the item of user equipment and to said item of core network equipment, an attachment request message for registering the item of user equipment with the core network and the item of user equipment also being suitable for transmitting, from the item of user equipment and to said item of core network equipment, a message requesting updating of localization areas at the expiry of a periodic time delay of a duration set by said item of core network equipment in an attachment acceptance message and/or in a message accepting updating of localization areas, wherein said item of user equipment comprises means for including, in each message requesting attachment to the core network and/or in each message requesting updating of localization areas, a proposed duration to be applied to said periodic time delay, and wherein said item of user equipment comprises means for including, in the attachment request message requesting attachment to the core network or in the message requesting updating of localization areas, information representing deactivation of said periodic time delay causing an activation in said item of core network equipment of another time delay of a predetermined duration enabling said item of core network equipment to transmit at least one message seeking said item of user equipment, when the item of user equipment has not established a connection via the cellular communication network before expiry of said other time delay, wherein said item of core network equipment comprises electronic circuitry adapted for reinitializing said other time delay when said item of core network equipment receives, from said item of user equipment, a message requesting updating of localization areas; and, wherein said item of core network equipment comprises circuitry adapted for limiting, in the attachment acceptance message and/or in the message accepting updating of localization areas, a list of localization areas to be monitored by said item of user equipment to a single localization area.

7. Item of user equipment according to claim 6, wherein said user equipment is a residential gateway or a smart meter.

* * * * *